Nov. 26, 1968   B. S. SAUTER   3,412,639
EXPANSIBLE THREADED FASTENER
Filed May 24, 1965   3 Sheets-Sheet 1
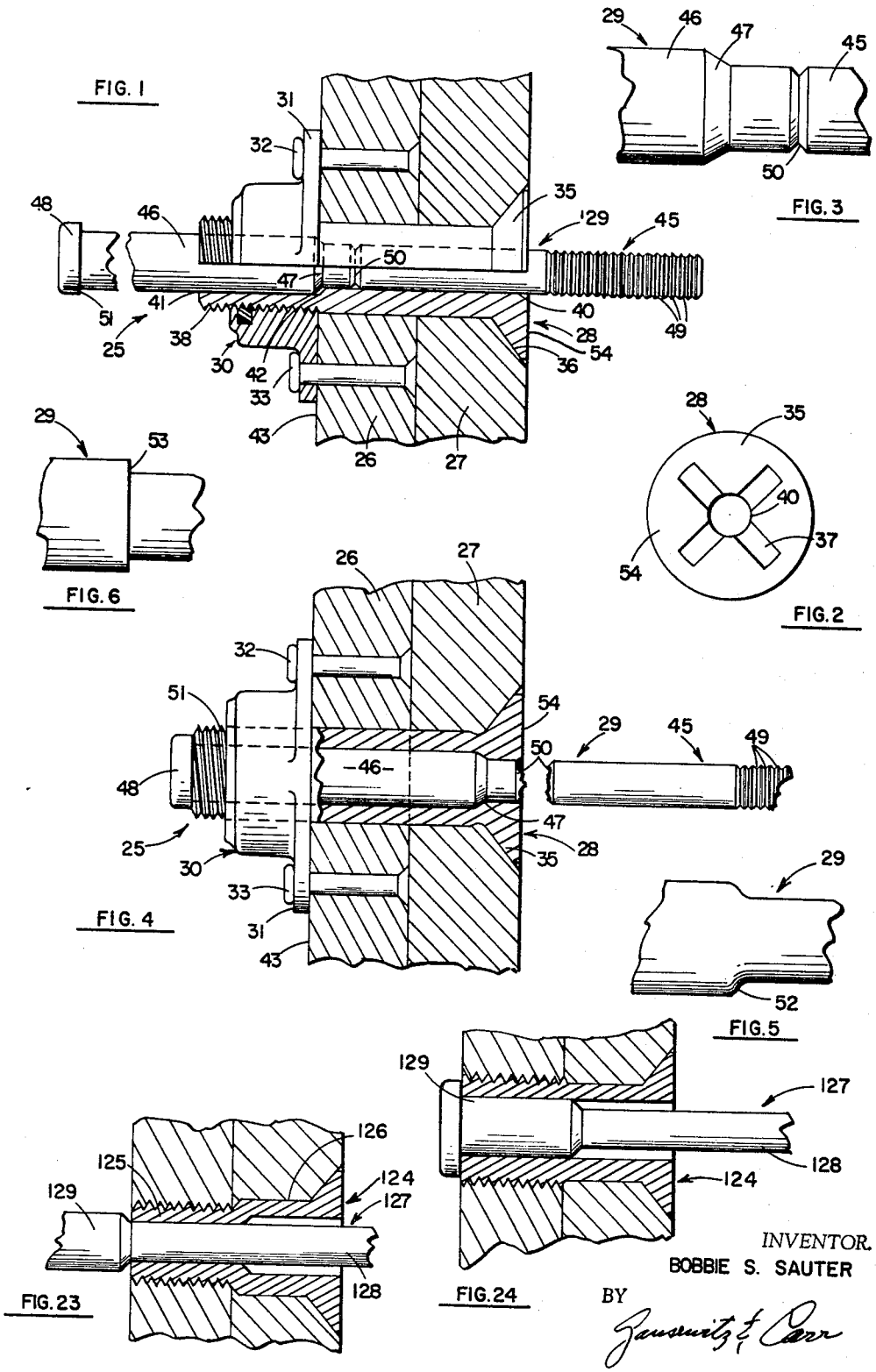
INVENTOR.
BOBBIE S. SAUTER
BY
ATTORNEYS

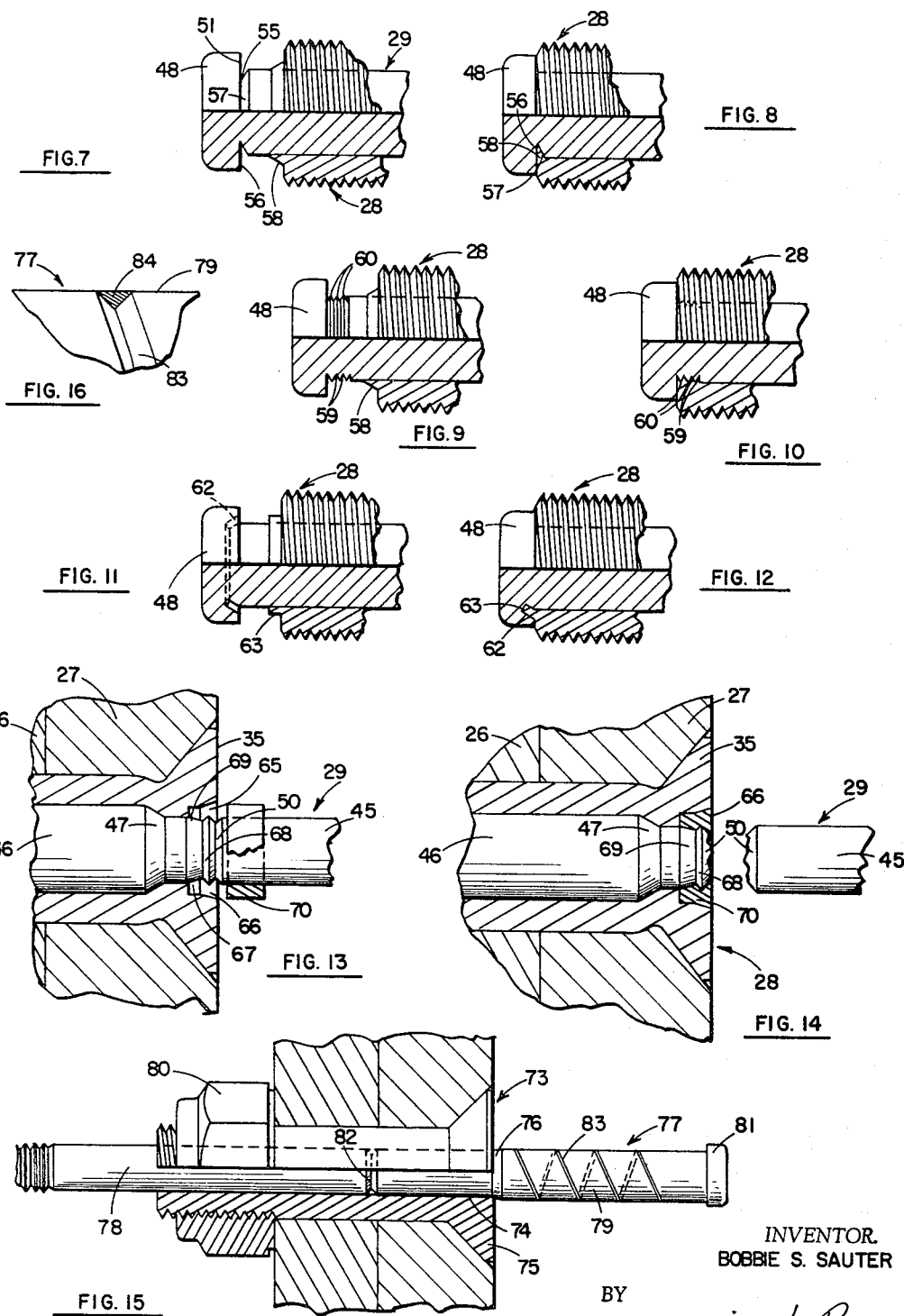

*INVENTOR.*
BOBBIE S. SAUTER

BY

*ATTORNEYS*

United States Patent Office 3,412,639
Patented Nov. 26, 1968

3,412,639
EXPANSIBLE THREADED FASTENER
Bobbie S. Sauter, Newport Beach, Calif.
(126 Nottoway Drive, Box 385, Penllyn, Pa. 19458)
Filed May 24, 1965, Ser. No. 458,288
12 Claims. (Cl. 85—72)

This invention pertains to a fastener that is secured as a bolt or screw and thereafter given a controlled expansion.

This invention can take a variety of forms, providing a fastener of exceptionally high strength characteristics. First, it is secured in the manner of a conventional bolt or screw, and can be tightened to a predetermined tensile load prior to expansion. The shank of the fastener is hollow, and extending axially through the fastener is a pull pin that provides the expansion effect after the threaded connection is made. Normally, this is accomplished by a shoulder located on the pin that forces the material of the surrounding sleeve radially outwardly as the pin is advanced through the fastener. Not only the amount of expansion but the location of the expansion may be established by the characteristic of the shoulder and its location. Also, a stepped expansion resulting from more than one shoulder, or tapered expansion from the use of a tapered surface flaring outwardly, can be accomplished as the pin is drawn through the fastener. Generally, there is a weakened portion provided on the pin so that it will break off at a predetermined location after the expansion has occurred. By this arrangement, the fastener cannot be overdriven, and the position of the break in the expansion mandrel provides a visual indication that proper expansion has taken place. The expansion element may be designed to break off flush with an end of the fastener, or it may be made longer to provide a projecting dowel or stud portion, extending outwardly after the expansion has been completed.

This design can accomplish several advantageous results. Among these are the ability to expand at the nut or female threaded portion to lock the fastener against rotation after the expansion has occurred. Also, expansion further along the shank can lock the various elements being secured into a unitary assembly. This radial expansion also can seal the opening through the work against leakage. By being expanded radially, the fastener can obtain a secure fit even for misaligned or oversize openings. This permits significant production economies by eliminating the need for matched-hole drilling and reaming. With the use of this fastener, close tolerance holes no longer are required even for a high-performance fastener. Upon expansion radially into the workpiece, a hoop tension can be created, which will reduce the fatiguing of the work, and hence increase the life and usefulness of the articles being fastened. Moreover, the expansion mandrel extending into the driving recess and locking the parts together can provide a tamper-proof fastener, giving a permanent attachment.

An object of this invention is to provide an expansible threaded fastener.

Another object of this invention is to provide a fastener that can be tightened to a predetermined tensile load and thereafter expanded in a controlled manner.

Yet another object of this invention is to provide an expansible threaded fastener in which the location and amount of expansion can be controlled accurately.

A further object of this invention is to provide a fastener that can be secured readily and in the conventional manner as a threaded bolt or screw, yet which is also expansible after being so attached.

An additional object of this invention is to provide an expansible threaded fastener from which can project an integral dowel or stud subsequent to the expansion.

A still further object of this invention is to provide an expansible fastener that can provide high performance characteristics without the necessity for close tolerance or closely matched holes in the work.

Yet another object of this invention is to provide a fastener that is expansible to lock the thread sections together after the attachment is complete, and which also can seal against fluid leakage.

These and other objects will become apparent from the following detailed description taken in connection with the accompanying drawing in which:

FIGURE 1 is a longitudinal sectional view, partially in elevation, of the fastener of this invention secured in a workpiece prior to expansion of the sleeve;

FIGURE 2 is an end elevation of the head end of the sleeve;

FIGURE 3 is an enlarged fragmentary side elevational view of a portion of the expansion member;

FIGURE 4 is a view similar to FIGURE 1 after the expansion has taken place;

FIGURES 5 and 6 are enlarged fragmentary elevational views of different shoulder configurations for the expansion member;

FIGURE 7 is a fragmentary longitudinal sectional view, partially in elevation, illustrating a means for locking the expansion pin in the sleeve;

FIGURE 8 is a view similar to FIGURE 7 after the completion of the locking action;

FIGURES 9 and 10 are views similar to FIGURES 7 and 8, respectively, showing a different means for locking the pin in the sleeve;

FIGURES 11 and 12 are additional views similar to FIGURES 7 and 8, respectively, illustrating a further locking arrangement;

FIGURE 13 is an enlarged fragmentary sectional view of an arrangement wherein the locking is effected by a separate element to be inserted in a recess;

FIGURE 14 is a sectional view illustrating the arrangement of FIGURE 13 after the locking element is in place;

FIGURE 15 is a longitudinal sectional view, partially in elevation, of the fastener arranged to cause expansion from the head end of the sleeve, and incorporating also a lubricating groove;

FIGURE 16 is an enlarged fragmentary view showing the lubricating groove;

FIGURES 23 and 24 are sectional views of the fastener before and after expansion, constructed to initially have different exterior diameters and subsequently expanded to provide a uniform exterior diameter.

Figure 17:
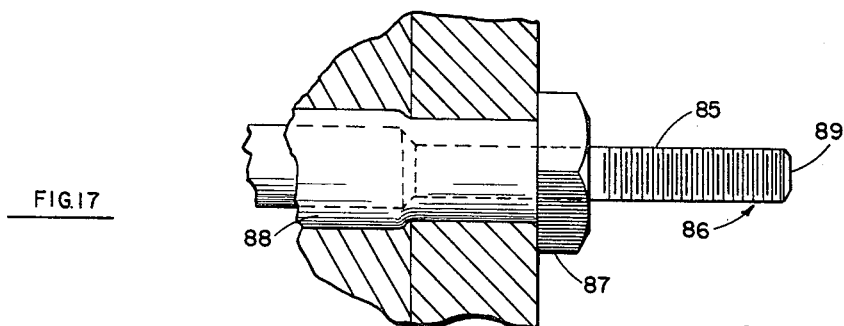
FIGURE 17 is a fragmentary longitudinal elevational view, partially in section, showing the fastener arranged to provide a projecting stud or dowel after expansion of the sleeve.

With reference in particular to FIGURES 1 through 4 of the drawing, the fastener 25 of this invention is illustrated as securing together members 26 and 27. The fastener is in three sections, these being a sleeve 28, an expansion pin or mandrel 29 and a nut 30. The latter member is shown as the type having a flange 31 at its base and secured to the workpiece 26 by means of rivets 32 and 33. However, a conventional hexagonal or any other type of nut could be used in place of the nut 30. Moreover, the fastener 25 may be utilized as a screw by eliminating the nut 30 and providing female threads in the workpiece to be fastened.

The sleeve 28 has a head 35 contoured for a flush installation into the countersink 36 in the workpiece 27. Any other type of head will work as well with the sleeve 28. The same holds true for the driving recess 37, which is shown as of cruciform configuration but which also could be a simple cross slot, a hexagonal recess or otherwise shaped. The opposite end 38 of the sleeve 28 is threaded so that it can be received in the nut 30.

A bore extends axially through the sleeve 28 and has a portion 40 at the right-hand end as the fastener is illustrated, smaller in diameter than the section 41 at the left-hand end of the fastener. Intermediate the bore sections 41 and 40, therefore, is a shoulder 42, which may be generally frustoconical, tapering inwardly and to the right. In the embodiment shown, the smaller portion 40 of the bore is of a length to correspond generally to the combined thicknesses of the workpieces 26 and 27 so that the shoulder 42 is located approximately in alignment with the outer surface 43 of the workpiece 26 after the sleeve 28 is driven into the nut 30.

The bore through the sleeve 28 is to receive the expansion mandrel 29, as illustrated in FIGURE 1. Normally, the member 29 is inserted into the bore in the sleeve after the sleeve has been threaded into the nut so that there will be full access to the driving slot 37 for the bit of the driving tool. In other instances, such as when there is a hexagonal head on the sleeve, the mandrel 29 is pre-assembled in the sleeve.

The expansion mandrel 29 includes a first portion 45 dimensioned to slide through the bore portion 40, while a larger section 46 can extend into the portion 41 of the bore of greater diameter. A tapered shoulder 47 interconnects the sections 45 and 46 of the member 29. At the outer end of the section 46 is a relatively small head 48. At the opposite end of the mandrel 29 at the outer end of the section 45, the device is provided with radial grooves 49.

Inwardly along the portion 45 of the mandrel 29 is an annular groove 50 located a predetermined distance from the tapered shoulder 47. The groove 50 reduces the cross section of the member 29, resulting in a weakened portion at that location.

In use of tht device of this invention, as illustrated in FIGURES 1 through 4, the sleeve 28 first is threaded into the nut 30, as described above. With the expansion pin or mandrel 29 fitted into the sleeve, the fastener will then be in the position of FIGURE 1, with the tapered shoulder 47 adjacent the shoulder 42 between the bore sections 40 and 41. After this, the outer end of the section 45 of the mandrel 29 at the location of the grooves 49 is gripped with a pulling tool of the type well known in the art, such as used in upsetting blind rivets. An axial force is exerted on the pin 29, urging it to the right as illustrated until the pin is forced into the sleeve to assume the position of FIGURE 4. In other words, the member 29 is moved to the right a distance sufficient to cause the undersurface 51 of the head 48 of the pin to bottom on the outer end of the sleeve 28. The tension force is maintained on the pin 29 until it breaks at the annular groove 50 where the pin is weakened.

As a result, the shank of the fastener becomes expanded at the portions within the workpieces 26 and 27 and inwardly of the head 35. This comes about through the reaction of the shoulder 47 against the shoulder 42 of the sleeve and the progressive enlargement of the sleeve in a radial direction as the shoulder 47 then is moved into the section 40 of the bore. By virtue of the established diameter of the portion 46 of the expansion mandrel 29, a precise amount of radial expansion of the sleeve is brought about as the mandrel is forced into the sleeve. Moreover, the expansion is effected through an accurately controlled portion of the length of the sleeve. The beginning of the expansion area is governed by the location of the shoulder 42 between the smaller and larger portions of the bore of the sleeve. The length of the expanded portion is established by the distance between the shoulder 47 of the mandrel and the undersurface 51 of the head 48 of that element. The member 29 can move into the sleeve only to the point where the undersurface 51 of the head 48 engages the outer end of the sleeve 28, which thereby acts as an abutment to limit the axial movement of the expansion member 29. In the embodiment illustrated in FIGURES 1 through 4, this is to position the expanded area of the sleeve up to the inner part of the head 35. With the pin 29 prevented from further movement by the interengagement of the head 48 and the end of the sleeve, the fracturing of the pin at the weakened area 50 occurs, and the expansion is complete.

It may be noted also that the break in the design shown is arranged to take place substantially flush with the outer face 54 of the head 35. This is easily taken care of by spacing the groove 50 an established distance from the head 48 so that the pin will be broken at this location. Of course, any other point may be selected, but in many instances a flush installation is preferred.

This construction realizes many of the advantages discussed above. The expansion of the sleeve into the workpiece can create hoop tension in the workpieces where the openings through them are dimensioned to cause the sleeve to be forced outwardly and compress the material adjacent the openings through the workpiece. This reduces fatiguing of the workpiece. Moreover, the members 26 and 27 become effectively locked together onto the sleeve by the outward expansion of the sleeve. While initially there was a bore through the sleeve, this now becomes filled by the expansion pin, and reverse driving of the fastener can be substantially precluded by the introduction of the mandrel into the driving recess. Of course, where the openings in the members 26 and 27 may be oversize or badly misaligned, the radial expansion of the sleeve within the openings through the workpiece can cause a firm engagement at such location despite those conditions. The firm engagement between the pin 29 and the sleeve 28, and between the sleeve and the work, can prevent fluid leakage at the location of the fastener 25.

The shoulder used in expanding the sleeve may assume a variety of forms, and is not limited to the tapered construction shown in FIGURES 1, 2 and 3. For example, as illustrated in FIGURE 5, the shoulder 52 of the expansion mandrel is rounded, making a smooth joinder with the portions of the pin of smaller and larger diameter. This type of pin shoulder construction will effectively expand the sleeve, while at the same time avoiding any sharp corners that could dig into the inner surface of the sleeve. This construction is particularly advantageous where the sleeve is made of a relatively hard material that is difficult to expand, or where the amount of expansion is to be relatively large.

In the embodiment of FIGURE 6, a radial shoulder is economically fabricated and provides a relatively sharp line of demarcation between expanded and unexpanded portions of the sleeve after the pin has been pulled. It is used effectively for softer materials, or where expansion is not especially large. Other configurations of the shoulder also may be used.

When the pin is forced into the sleeve in expanding it, there is considerable frictional force between the section 46 of the member 29 and the expanded portion of the sleeve. This tends to hold the expansion member 29 within the sleeve during the time the fastener is in service. However, to insure complete pin retention under extreme conditions involving vibrational forces and the like, it is preferred to include a positive means to lock the pin in place. The arrangement shown in FIGURES 7 and 8 will accomplish this automatically as the expansion mandrel 29 is moved inwardly to seat against the end of the sleeve. According to this construction, there is provided an annular groove 55 in the expansion mandrel 29 immediately adjacent the underside 51 of the head 48. The groove 55 includes a radial wall 56, which forms a continuation of the undersurface of the head. An inclined wall 57 extends inwardly and toward the head, joining the radial wall 56 to give the groove 55 a V-shaped cross section. On the end of the sleeve 28 is formed a relatively short frustoconical section 58 tapering away from the end of the sleeve and toward its axis.

When the expansion member 29 is pulled to the right as the device is illustrated, the end of the frustoconical section 58 of the sleeve will encounter the outer portion of the wall 56 of the groove 55. Continued movement will cause a reaction between the radial groove surface and the tapered surface of the section 58, thereby forcing this projecting lip of the sleeve into the groove 55 so that when the head 48 is bottomed against the end of the sleeve the section 58 now is bent to fit inside the groove 55 as shown in FIGURE 8. The portion 58 of the sleeve, therefore, cooperating with the groove 55, forms a positive barrier precluding relative movement of the pin and the sleeve. Consequently, the expansion pin 29 is locked with respect to the sleeve and will remain axially fixed in it.

Somewhat similar is the design of FIGURES 9 and 10 in which the sleeve again has the outwardly tapering frustoconical lip 58. Instead of an annular groove, however, the pin 29 now is formed with a plurality of shallower grooves 59, which thereby define annular teeth 60 adjacent the undersurface 51 of the head 48. With this construction, when the pin 29 is pulled to the right, the portion 58 of the sleeve will be forced into the grooves 59 so that it will cooperate with the teeth 60 to hold the pin against movement relative to the sleeve.

Another locking design is illustrated in FIGURES 11 and 12, in which a tapered groove 62 is formed in the undersurface of the head 48 around the periphery of the section 46 of the pin. The groove 62 is convergent toward the axis of the pin beyond the outer end of the pin. In this version, the sleeve 28 is provided with a lip 63 at its outer end, this being rectangular in section and substantially the same thickness radially as that of the groove 62. Consequently, when the pin is pulled to the right, the lip 63 enters the groove 62 and is bent inwardly to the contour of the groove. This locks the pin in the sleeve.

Another locking arrangement for the pin is illustrated in FIGURES 13 and 14 and, by this construction, the pin is locked at the head end of the sleeve rather than at the threaded portion adjacent the nut. Here, the bore through the sleeve is provided with an enlarged portion 65 at the head end. The outer section 66 of this enlargement of the bore flares outwardly, as shown.

Immediately adjacent the groove 50, where the pin 29 is broken following the expansion of the sleeve, is an additional annular recess 67. This groove is substantially V-shaped in cross section, with its outer wall 68 more steeply inclined than the inner wall 69. Circumscribing the end portion 45 of the pin 29 is a collar 70 of relatively soft malleable metal. When the pin is pulled to fully expand the sleeve, the collar 70 is forced inwardly (to the left as shown) to enter the enlarged section 65 of the bore around the pin. The collar 70 may be caused to enter this section of the bore by the same tool used in pulling the pin. The outwardly flaring section 66 of the recess 65 cams the inner portion of the collar inwardly when the collar moves into this recess. As the collar is forced into the recess, therefore, it completely occupies all the space around the pin and is deformed to enter the groove 67. Consequently, the pin is securely locked against movement and cannot be driven in the reverse direction because of the material of the collar 70 behind the shoulder 68 of the pin. When the installation is complete, the pin is broken at the weakened section at the groove 50 in the usual manner.

In the arrangement described above, the pin has been pulled to expande the sleeve in the direction extending from the nut. It is equally possible to construct the invention to expand from the head end of the fastener, such as embodiment being shown in FIGURE 15. In this arrangement, the sleeve 73 has a uniform bore 74 to result in expansion from the outer face of the head 75. Alternatively, the two-diameter bore previously described can be utilized as well. A tapered shoulder 76 is provided on the expansion pin 77 intermediate the portion of smaller diameter 78 and that of larger diameter 79. In this arrangement, the section 78 is gripped and pulled to the left as the device is illustrated, so that the shoulder 76 expands the sleeve in the same manner as that described above, but from the head 75 rather than from the nut 80. Again, when the head 81 of the pin is seated against the head 75 of the sleeve, the pin is broken at the weakened area 82.

Also illustrated in connection with the arrangement of FIGURE 15, and applicable equally to the other constructions, is the use of a helical groove 83 in the portion 79 of the pin 77 that enters the bore 74 of the sleeve when the expansion takes place. The shallow groove 83, a fragment of which may be seen in enlarged detail in FIGURE 16, is to retain lubricant 84 to facilitate movement of the pin into the sleeve. This reduces the frictional effort required in pulling the pin into the sleeve, assuring that there is complete expansion in bottoming of the head of the pin with no premature breakage of the pin.

The expansion pin need not be designed to break off flush with the end of the sleeve portion of the fastener, but instead may be permitted to project outwardly from the fastener, such as seen in FIGURE 17. As illustrated, there is a threaded outer section 85 of the pin 86 that projects beyond the head 87 of the sleeve 88 after the expansion of the sleeve has taken place. The threaded projecting end 85 of the pin thereby becomes a stud extending from the work for use in securing any other desired elements. The weakened section of the pin may be formed at the outer end 89 of the pin 86 at the termination of the threaded portion 85. Alternative to he use of a projecing threaded portion, the outer part of the pin may be unthreaded to act as a dowel, or it may have other configuration to suit a particular purpose.

Figure 18:
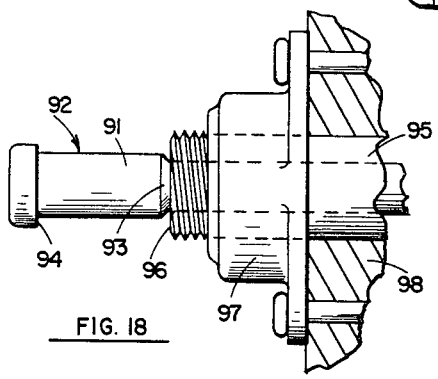
FIGURE 18 is a fragmentary longitudinal elevational view, partially in section, of the fastener constructed to accomplish expansion only at the nut.
Figure 19:
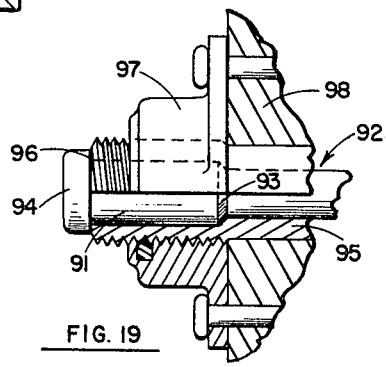
FIGURE 19 is an illustration of the arrangement of FIGURE 18 after the expansion has taken place.

In the embodiment of FIGURES 18 and 19, the expansion of the sleeve is localized at the area of the nut. This will give a locking action to secure the threads of the sleeve to those of the nut to prevent disengagement. Nevertheless, the remainder of the sleeve in this embodiment will act as a conventional bolt. This result is accomplished by properly dimensioning the enlarged portion 91 of the pin 92 so that the expansion shoulder 93 is a distance from the underside of the head 94 of the pin an amount substantially the same as the length of the sleeve 95 between its outer end 96 and the base of the nut 97. Consequently, when the pin 92 is pulled to the right, the only expansion that will occur is that at the nut 97 so that the threads are locked, and while the fastener is in service it will not be rotated into disengagement. No expansion occurs within the opening through the member 98 being secured by the fastener.

Figure 20:
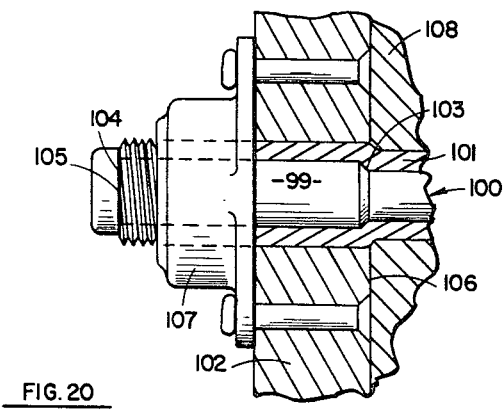
FIGURE 20 is a fragmentary longitudinal sectional vitw, partially in elevation, of an expanded fastener in which the sleeve is expanded both at the nut and at one of the two workpieces being secured.

Another example of selective localized expansion is illustrated in FIGURE 20. In this configuration, the enlarged portion 99 of the pin 100 is of a length to expand the sleeve 101 both at the nut and through the thickness of the outer workpiece 102. Consequently, the distance between the shoulder 103 of the pin and the undersurface 104 of the head of the pin is made substantially equal to the distance between the outer end 105 of the sleeve 101 and the inner surface 106 of the workpiece 102. The result is radial expansion of the sleeve 101 where it extends through the nut 107 and the workpiece 102, but no expansion will occur in the zone of the second workpiece 108.

Figure 21:
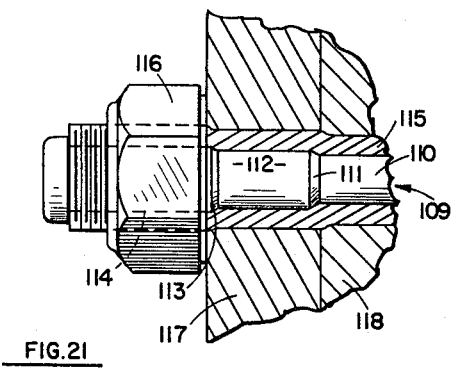
FIGURE 21 is a fragmentary longitudinal sectional view, partially in elevation, of the fastener arranged to provide a stepped expansion.

Stepped expansion also can be accomplished, an example of this being shown in FIGURE 21. This is accomplished by providing the pin with three or more different diameters rather than two. As shown in this version, the pin 109 has a smaller diameter section 110 that, through shoulder 111, connects to an intermediate portion 112. The latter section, through shoulder 113, joins the larger section 114 of the pin. Consequently, when the pin is pulled into the sleeve 115, the section 112 will expand a first part of the sleeve to one diameter while the section 114 will expand another portion of the sleeve to a greater diameter. By proper proportioning, the areas expanded can be carefully controlled, with the lengths of the sections 112 and 114 being arranged in FIGURE 21 to expand the sleeve at the nut 116 to the larger diameter and at the workpiece 117 to the smaller expanded diameter. No expansion occurs at the second workpiece 118 in the arrangement of FIGURE 21.

Figure 22:
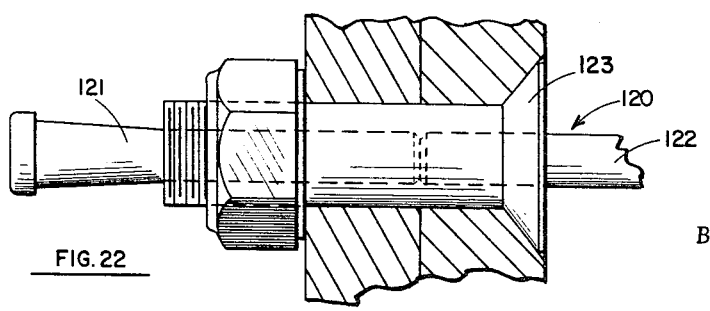
FIGURE 22 is an elevational view of the fastener constructed to provide a tapered expansion.

The fastener can be constructed to create even further variations in the expansion of the sleeve. As shown in FIGURE 22, a tapered expansion will occur. This comes about from providing the pin 120 with an outwardly flaring frustoconical portion 121 connecting to the cylindrical part 122. The section 121 of the pin will expand the sleeve 123 progressively as the pin is drawn into the sleeve. Consequently, the outer portion of the sleeve will be expanded to a greater degree, decreasing uniformly to the inner end of the section 121 where the expanded portion merges with the unexpanded part. The length of the tapered portion 121 governs the location of the expansion and the amount of the sleeve which is enlarged in this manner.

Rather than initially being of uniform exterior diameter and expanded to sections of different size, the sleeve may first have an outer contour that varies, and later be expanded to a uniform size. An example of this is found in FIGURES 23 and 24 where the sleeve 124 has a first section 125 of relatively small diameter and a second portion 126 that is larger. The pin 127 has a thinner part 128 that fits in the smaller portion 125 of the sleeve. The larger part 129 of the pin 127 is substantially the same diameter as the larger portion 126 of the bore. Consequently, when the pin is pulled, the section 125 of the sleeve is expanded to assume the same diameter as the portion 126 that initially was the larger. This type of expansion may be applied as well by proper proportioning for the stepped and the tapered expansions. Also, it is possible to have different exterior diameters along the length of the sleeve both before and after expansion.

I claim:
1. A fastener comprising:
a sleeve member having exterior threads adjacent one end thereof,
a head projecting radially outwardly from a location adjacent the opposite end of said sleeve member,
said head including surface means for imparting rotational forces thereto,
said sleeve member having an axial bore therethrough,
and an unthreaded expansion member,
said expansion member having a first portion of a relatively small diameter axially slidably fitting in said bore,
and a second portion of larger diameter,
the diameter of said second portion being larger than the diameter of at least a portion of said bore,
said expansion member being axially movable relative to said sleeve member in response to an axial pull thereon, said second portion of said expansion member being adapted to be forced into said portion of said bore upon said axial movement of said expansion member,
whereby said second portion of said expansion member causes expansion of said sleeve member,
said sleeve member and said expansion member having interengageable abutment means for limiting the movement of said second portion into said bore
for thereby controlling the length of the sleeve member expanded by said second portion of said expansion member.

2. A fastener comprising:
an elongated sleeve member having external threads adjacent one end thereof,
a head projecting radially outwardly from a location adjacent the opposite end of said sleeve member,
means at said head for imparting rotational forces to said sleeve member,
said sleeve member having an axial bore extending therethrough,
and an internally threaded member at said one end of said sleeve member engaging said threads of said sleeve member for cooperating with said head in holding said sleeve member in a workpiece, an expansion member for radially enlarging said sleeve member,
said expansion member including a first portion of a relatively small diameter slidably received in said bore and projecting outwardly from one end of said sleeve member,
said expansion member having a second portion of larger diameter extending outwardly from the opposite end of said bore,
said first portion of said expansion member that extends from said one end being adapted to be pulled axially thereby to bring said second portion of said expansion member into said bore and effect a radial expansion of said sleeve member,
said sleeve member having an abutment surface at an end thereof, said expansion member having an abutment projecting from said second portion for engagement with said abutment surface of said sleeve member for thereby limiting the inward movement of said second portion with respect to said bore and controlling the length of expansion of said sleeve member,
said first portion of said expansion member having a relatively weak portion adapted to break subsequent to said expansion for thereby controlling the longitudinal dimension of said expansion member.

3. A device as recited in claim 2 including in addition:
means for locking said expansion member in said bore subsequent to said expansion.

4. A device as recited in claim 3 in which:
said locking means includes a groove in said expansion member,
and an element deformable to enter said groove and interferingly prevent relative axial movement of said sleeve member and said expansion member.

5. A device as recited in claim 2 in which:
said second portion of said expansion member is provided with groove means therein,
and including in addition a lubricant in said groove means for thereby facilitating entry of said second portion of said expansion member into said bore.

6. A fastener comprising:
a first elongated sleeve member having exterior threads adjacent one end thereof,
a head at the opposite end of said sleeve member, means at said head for imparting rotational forces thereto, said sleeve member having an axial bore therethrough, an internally threaded member at said one end of said sleeve member engaging said threads of said sleeve member for cooperating with said head in holding said sleeve member in a workpiece, and an expansion member, said expansion member including a first portion of a relatively small diameter slidably received in said bore, one end of said first portion extending outwardly from one end of said sleeve member, said expansion member having a second portion of a relatively large diameter axially aligned with said first portion and extending from the opposite end of said first portion, said second portion being larger in diameter than at least a portion of said bore and positioned outwardly of said portion of said bore, said one end of said first portion being adapted to receive an axial pulling force for moving said second portion of said expansion member into said portion of said bore for thereby expanding said sleeve member, said second portion of said expansion member having an abutment spaced from said first portion of said expansion member, said sleeve member having an abutment surface at an end thereof, said abutment of said expansion member being adapted to engage said abutment surface of said sleeve member upon said moving of said second portion into said portion of said bore for thereby limiting the movement of said expansion member into said sleeve member, said abutment of said expansion member being spaced a predetermined distance from the inner end of said second portion for thereby controlling the linear extent of the expansion of said sleeve member.

7. A device as recited in claim 6 in which:

said first portion of said expansion member includes a frangible portion which will break under a predetermined tension force which force is below that which would be sufficient to break other portions of said expansion member, said frangible portion being spaced a predetermined distance from said abutment of said expansion member, whereby said expansion member assumes a predetermined length upon the breakage of said frangible portion.

8. A device as recited in claim 7 in which:

said predetermined distance is such that said frangible portion is positioned substantially flush with said one end of said sleeve member when said expansion member is moved into said bore sufficiently to bring said abutment of said expansion member into engagement with said abutment surface of said sleeve member.

9. A device as recited in claim 7 in which:

said predetermined distance is such that said frangible portion is disposed outwardly of said one end of said sleeve member when said expansion member is moved into said bore sufficiently to bring said abutment of said expansion member into engagement with said abutment surface of said sleeve member, whereby upon breaking said expansion member at said frangible portion, said first portion of said expansion member provides an integral extension element projecting axially from said bore beyond said sleeve member.

10. A device as recited in claim 6 in which said bore includes:

a first portion substantially complementary to said first portion of said expansion member, a second portion substantially complementary to said second portion of said expansion member, and a shoulder interconnecting said portions of said bore, said expansion member having a shoulder intermediate said first and second portions of said expansion member for effecting expansion of said sleeve member at said first portion of said bore upon said moving of said second portion of said expansion member into said bore.

11. A device as recited in claim 10 in which said expansion member includes:

a third portion of a diameter larger than that of said second portion, said third portion being movable into said bore upon said movement of said expansion member for thereby effecting a greater expansion of said sleeve member than that effected by said second portion of said expansion member.

12. A device as recited in claim 6 in which:

said second portion of said expansion member is of substantially frustoconical configuration diverging away from said portion of said bore for thereby accomplishing a progressive expansion of said sleeve member upon said movement of said expansion member.

References Cited

UNITED STATES PATENTS

| | | | |
|---|---|---|---|
| 577,737 | 2/1897 | Flaherty | 85—83 |
| 1,013,222 | 1/1912 | Ruecking | 85—83 |
| 2,057,648 | 10/1936 | Kiefner | 85—83 |
| 2,248,755 | 7/1941 | Hathorn | 85—82 |
| 1,428,247 | 9/1922 | Morris | 85—10.1 |
| 1,926,834 | 9/1933 | Campbell | 85—10.1 |
| 2,408,559 | 10/1946 | Keating | 85—77 |
| 2,501,567 | 3/1950 | Huck | 85—78 |
| 2,538,623 | 1/1951 | Keating | 85—78 |
| 2,545,752 | 3/1951 | Singleton | 85—78 |
| 2,859,056 | 11/1958 | Marks | 85—77 |
| 2,887,003 | 5/1959 | Brilmyer | 85—72 |
| 3,007,364 | 11/1961 | Dickie | 85—78 |

FOREIGN PATENTS

| | | |
|---|---|---|
| 640,451 | 7/1950 | Great Britain. |
| 1,254,584 | 1/1961 | France. |
| 1,377,442 | 9/1964 | France. |
| 854,828 | 11/1960 | Great Britain. |
| 856,808 | 12/1960 | Great Britain. |

MARION PARSONS, JR., *Primary Examiner.*